United States Patent
Chuang

(10) Patent No.: US 10,795,501 B1
(45) Date of Patent: Oct. 6, 2020

(54) TOUCH APPARATUS

(71) Applicant: Tsung-Yen Chuang, Hsinchu County (TW)

(72) Inventor: Tsung-Yen Chuang, Hsinchu County (TW)

(73) Assignee: ITE Tech. Inc., Hsinchu (TW)

( * ) Notice: Subject to any disclaimer, the term of this patent is extended or adjusted under 35 U.S.C. 154(b) by 0 days.

(21) Appl. No.: 16/454,079

(22) Filed: Jun. 27, 2019

(30) Foreign Application Priority Data

Apr. 3, 2019 (TW) ................ 108112042 A

(51) Int. Cl.
*G06F 3/041* (2006.01)
*G06F 3/047* (2006.01)
*G06F 3/0488* (2013.01)

(52) U.S. Cl.
CPC .......... *G06F 3/04164* (2019.05); *G06F 3/047* (2013.01); *G06F 3/04886* (2013.01)

(58) Field of Classification Search
CPC ... G06F 3/04164; G06F 3/047; G06F 3/04886
USPC .................. 345/173, 174; 178/18.06; 349/43
See application file for complete search history.

(56) References Cited

U.S. PATENT DOCUMENTS

| | | | |
|---|---|---|---|
| 7,656,392 B2 | 2/2010 | Bolender | |
| 7,786,981 B2 | 8/2010 | Proctor | |
| 8,440,920 B2 * | 5/2013 | Bulea .................. | G06F 3/044 178/18.06 |
| 9,092,106 B2 * | 7/2015 | Chen .................... | G06F 3/044 |
| 9,898,115 B2 | 2/2018 | Wu et al. | |
| 10,216,349 B2 * | 2/2019 | Nakayama ............. | G06F 3/044 |
| 2006/0227117 A1 | 10/2006 | Proctor | |
| 2008/0218951 A1 * | 9/2008 | Kusuda ................. | G06F 1/1603 361/751 |
| 2008/0252608 A1 * | 10/2008 | Geaghan ................ | G06F 3/044 345/173 |
| 2014/0092026 A1 * | 4/2014 | Singh ..................... | G06F 3/044 345/173 |
| 2014/0152934 A1 * | 6/2014 | Huh ................. | G02F 1/133784 349/43 |
| 2016/0202826 A1 | 7/2016 | Han et al. | |
| 2016/0246423 A1 * | 8/2016 | Fu ........................ | G06F 3/0412 |
| 2016/0291710 A1 | 10/2016 | Kang | |
| 2017/0024030 A1 * | 1/2017 | Wu ........................ | G06F 3/044 |
| 2017/0192586 A1 * | 7/2017 | Lin ....................... | G06F 3/0412 |

(Continued)

FOREIGN PATENT DOCUMENTS

| | | |
|---|---|---|
| CN | 204360355 | 5/2015 |
| TW | M478874 | 5/2014 |

OTHER PUBLICATIONS

"Office Action of Taiwan Counterpart Application," dated Dec. 5, 2019, p. 1-8.

*Primary Examiner* — Prabodh M Dharia
(74) *Attorney, Agent, or Firm* — JCIPRNET

(57) ABSTRACT

A touch apparatus includes first touch electrodes and at least one edge touch electrode. Each of the first touch electrodes has first edges and a first side edge. A first acute angle is included by the first edges. The first side edge is connected to the first edges and is disposed opposite to the first acute angle. The at least one edge touch electrode is disposed outside the first touch electrodes. A shape of the at least one edge touch electrode is different from a shape of each of the first touch electrodes, and the at least one edge touch electrode has a non-straight edge.

12 Claims, 7 Drawing Sheets

(56) References Cited

U.S. PATENT DOCUMENTS

| | | | |
|---|---|---|---|
| 2017/0235395 A1* | 8/2017 | Long | G06F 3/0412 |
| | | | 345/174 |
| 2018/0068156 A1* | 3/2018 | Jang | G06K 9/00 |
| 2018/0164902 A1 | 6/2018 | Spevak | |
| 2018/0348910 A1* | 12/2018 | Lee | G06F 3/0412 |
| 2019/0286281 A1* | 9/2019 | Aoki | G06F 3/041 |

* cited by examiner

TOUCH APPARATUS

CROSS-REFERENCE TO RELATED APPLICATION

This application claims the priority benefit of Taiwan application serial no. 108112042, filed on Apr. 3, 2019. The entirety of the above-mentioned patent application is hereby incorporated by reference herein and made a part of this specification.

BACKGROUND OF THE INVENTION

Field of the Invention

The disclosure relates to an electronic apparatus, and more particularly, to a touch apparatus.

Description of Related Art

In conventional touch apparatuses, the shape of the touch response area is mainly rectangular. However, when the design of a product requires a different external shape, such as a circle, an ellipse, or another shape, generally a decorative shape without touch sensing functions is additionally added outside the rectangular touch response area. Therefore, apart from the rectangular touch response area, the peripheral area of the touch apparatus generally does not have touch sensing functions.

In general, to provide touch sensing functions in the peripheral area, touch electrodes may be disposed in the peripheral area of the touch apparatus. However, since the shape of the touch electrodes disposed in the peripheral area is significantly different from the shape of the touch electrodes disposed in the rectangular touch response area, the complexity of the overall algorithm is significantly increased such that a desirable positioning accuracy cannot be obtained in the peripheral area. In addition, due to the large total numbers of the touch electrodes disposed in the peripheral area and the touch electrodes disposed in the rectangular touch response area, the connection width of the touch apparatus and the chip becomes excessively large, which is not favorable for mounting to a mechanism.

SUMMARY OF THE INVENTION

The invention provides a touch apparatus having excellent performance.

A touch apparatus of the invention includes first touch electrodes and a peripheral electrode. Each of the first touch electrodes has first edges and a first side edge. A first acute angle is included by the first edges. The first side edge is connected to the first edges and is disposed opposite to the first acute angle. The peripheral electrode is disposed outside the first touch electrodes. A shape of the peripheral electrode is different from a shape of each of the first touch electrodes, and the peripheral electrode has a non-straight edge.

In an embodiment of the invention, the touch apparatus further includes second touch electrodes. Each of the second touch electrodes has second edges and a second side edge. A second acute angle is included by the second edges. The second side edge is connected to the second edges and is disposed opposite to the second acute angle. The peripheral electrode is disposed outside the second touch electrodes, and the first touch electrodes, the second touch electrodes, and the at peripheral electrode are arranged in a circle or a quasi-circle to define a circular touch area or a quasi-circular touch area. The first touch electrodes and the second touch electrodes are alternately arranged along a vertical axis of the circular touch area or on a vertical axis of the quasi-circular touch area, and the first acute angles of the first touch electrodes and the second acute angles of the second touch electrodes are respectively located on two sides of the vertical axis of the circular touch area or on two sides of the vertical axis of the quasi-circular touch area.

In an embodiment of the invention, the first side edge is an arc-shaped edge and the second side edge is an arc-shaped edge.

In an embodiment of the invention, the first touch electrodes and the second touch electrodes are divided into touch electrode groups, and each of the touch electrode groups includes one first touch electrode and one second touch electrode which are adjacent to each other. The touch apparatus further includes a first conductive line, wherein the first touch electrodes of adjacent touch electrode groups are electrically connected to the same first conductive line. The touch apparatus further includes a second conductive line, wherein the second touch electrodes of adjacent touch electrode groups are electrically connected to the same second conductive line.

In an embodiment of the invention, the quasi-circular touch area includes an elliptical touch area or a major segment touch area.

In an embodiment of the invention, the peripheral electrode includes arcuate triangular electrodes.

In an embodiment of the invention, the arcuate triangular electrodes are disposed on one side of the first touch electrodes.

In an embodiment of the invention, the arcuate triangular electrodes are disposed on two opposite sides of the first touch electrodes.

In an embodiment of the invention, the peripheral electrode includes at least one circular segment electrode.

In an embodiment of the invention, the at least one circular segment electrode is multiple circular segment electrodes respectively disposed on two opposite sides of the first touch electrodes.

In an embodiment of the invention, the first edges of each of the first touch electrodes include a first upper edge and a first lower edge, the first upper edges of the first touch electrodes are substantially parallel to each other, and the first lower edges of the first touch electrodes are substantially parallel to each other.

In an embodiment of the invention, the second edges of each of the second touch electrodes include a second upper edge and a second lower edge, second upper edges of the second touch electrodes are substantially parallel to each other, and second lower edges of the second touch electrodes are substantially parallel to each other.

To make the aforementioned more comprehensible, several embodiments accompanied with drawings are described in detail as follows.

DESCRIPTION OF THE EMBODIMENTS

It is noted that, due to electrical properties, the touch electrodes in the accompanying drawings are not connected to each other but are separated by a fine pitch. However, to facilitate the understanding of the invention, the fine pitch is omitted from the accompanying drawings.

Figure 1:
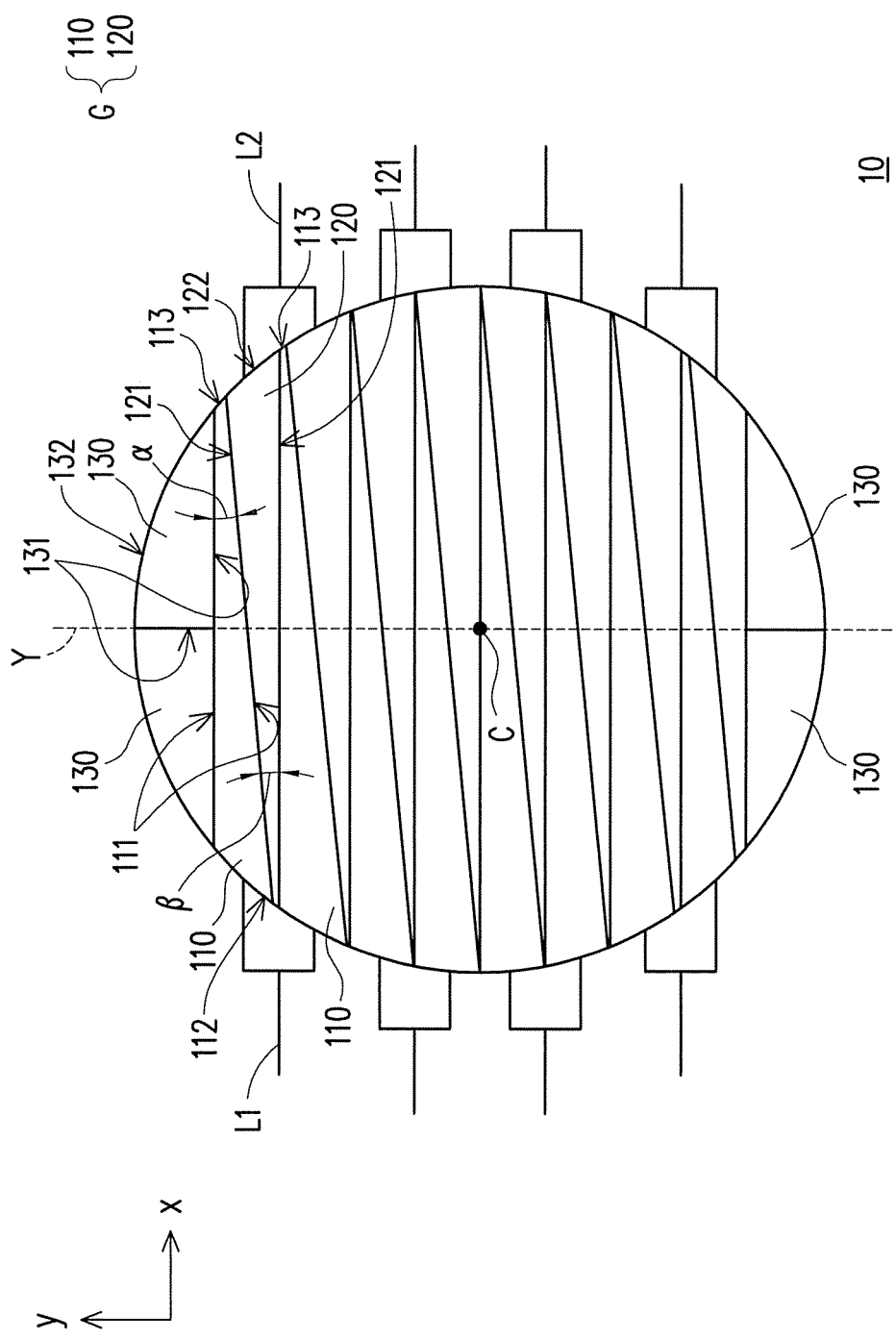
FIG. 1 is a schematic top view of a touch apparatus 10 according to an embodiment of the invention.

FIG. 1 is a schematic top view of a touch apparatus 10 according to an embodiment of the invention. Referring to FIG. 1, the touch apparatus 10 includes first touch electrodes 110, second touch electrodes 120, and peripheral electrode 130. The first touch electrodes 110, the second touch electrodes 120, and the peripheral electrode 130 are arranged in a non-rectangular shape to define a non-rectangular touch area.

For example, in the present embodiment, the non-rectangular touch area may be a circular touch area. However, the invention is not limited thereto. According to other embodiments, the non-rectangular touch area may also be in a non-rectangular shape other than a circular shape, which will be illustrated with examples in subsequent paragraphs with reference to other drawings.

In addition, in the present embodiment, the first touch electrodes 110, the second touch electrodes 120, and the peripheral electrodes 130 are formed in one single layer. In other words, the touch apparatus 10 in which all the touch electrodes 110, 120, and 130 are formed in one single layer so that the touch apparatus 10 exhibits an advantage of saving costs.

Each of the first touch electrodes 110 has first edges 111 and a first side edge 112. A first acute angle α is included by the first edges 111. The first side edge 112 is connected to the first edges 111 and is disposed opposite to the first acute angle α. Each of the second touch electrodes 120 has second edges 121 and a second side edge 122. A second acute angle β is included by the second edges 121. The second side edge 122 is connected to the second edges 121 and is disposed opposite to the second acute angle β. In brief, the shape of the first touch electrode 110 and the shape of the second touch electrode 120 may be a triangular shape or approximate a triangular shape.

For example, in the present embodiment, the first side edge 112 of the first touch electrode 110 may be an arc-shaped edge, the second side edge 122 of the second touch electrode 120 may be an arc-shaped edge, and the shape of the first touch electrode 110 and the shape of the second touch electrode 120 may approximate a triangular shape. However, the invention is not limited thereto. In an unillustrated embodiment, the first side edge 112 of the first touch electrode 110 and the second side edge 122 of the second touch electrode 120 may also be straight edges or edges of other shapes.

The first touch electrodes 110 and the second touch electrodes 120 are alternately arranged along a vertical axis Y of the non-rectangular touch area. The first acute angles α of the first touch electrodes 110 and the second acute angles β of the second touch electrodes 120 are respectively located on two sides of the vertical axis Y of the non-rectangular touch area. For example, in the present embodiment, the first acute angles α of the first touch electrodes 110 may be located on the right side of the vertical axis Y, and the second acute angles 13 of the second touch electrodes 120 may be located on the left side of the vertical axis Y, but the invention is not limited thereto.

The peripheral electrode 130 is disposed outside the first touch electrodes 110 and the second touch electrodes 120. The shape of the peripheral electrode 130 is different from the shape of the first touch electrode 110 and the shape of the second touch electrode 120, and the peripheral electrode 130 has a non-straight edge 132.

For example, in the present embodiment, the peripheral electrode 130 may have two straight edges 131 perpendicular to each other and a non-straight edge 132 connected to the two straight edges 131. The non-straight edge 132 is, for example, an arc-shaped edge, but the invention is not limited thereto. In other words, in the present embodiment, the peripheral electrode 130 may be an arcuate triangular electrode. However, the invention is not limited thereto. According to other embodiments, the peripheral electrode 130 may also be in other shapes, which will be illustrated with examples in subsequent paragraphs with reference to other drawings.

It is noted that, in the touch apparatus 10, the first and second touch electrodes 110 and 120 which are in triangular shapes or approximate triangular shapes are disposed in the middle area of the touch apparatus 10, and the peripheral electrode 130 is disposed outside the first and second touch electrodes 110 and 120, so as to form the non-rectangular touch area. Therefore, regardless of the area size and/or the shape of the non-rectangular touch area of the touch apparatus 10, by appropriately increasing or decreasing the numbers of the first and second touch electrodes 110 and 120, it is possible to realize the touch apparatus 10 having various non-rectangular touch areas without limitation on the applications.

Furthermore, in terms of the positioning accuracy, in a direction y parallel to the vertical axis Y, with the first and second touch electrodes 110 and 120 disposed in the direction y, the touch apparatus 10 has a high positioning accuracy in the direction y. On the other hand, in a direction x perpendicular to the vertical axis Y, when calculating the touch position through an algorithm, it is only necessary to process the configuration block of the peripheral electrode 130 and the boundary between the peripheral electrode 130 and the first touch electrode 110 (and/or the second touch electrode 120), which can significantly reduce the complexity of the algorithm and achieve more desirable position resolution and positioning accuracy. In addition, the touch apparatus 10 of the present embodiment is also suitable for multi-finger touch and can provide a user-friendly operation mode.

Referring to FIG. 1, in the present embodiment, the first touch electrodes 110 and the second touch electrodes 120 may be divided into touch electrode groups G. Each of the touch electrode groups G includes one first touch electrode 110 and one second touch electrode 120 adjacent to each other. In particular, in the present embodiment, the first touch electrodes 110 of the adjacent touch electrode groups G may be electrically connected to a same first conductive line L1, and the second touch electrodes 120 of the adjacent touch electrode groups G may be electrically connected to a same second conductive line L2. In other words, the first touch electrodes 110 of the adjacent touch electrode groups G may be electrically connected to the same bonding point (not shown) through the first conductive line L1, and the second touch electrodes 120 of the adjacent touch electrode groups G may be electrically connected to the same bonding point through the second conductive line L2. Accordingly, the number of bonding points between the touch apparatus 10 and an external driving component (e.g., a chip (not shown)) can be reduced, which contributes to the reduction in the connection width of the touch apparatus 10 and the external driving component.

It is noted here that the reference numerals and parts of the content of the above embodiment apply to the following embodiments. The same numerals are used to refer to the same or similar elements, and the description of the same technical content is omitted. Reference may be made to the above embodiment for the description of the omitted parts, which shall not be repeated in the following embodiments.

Figure 2:
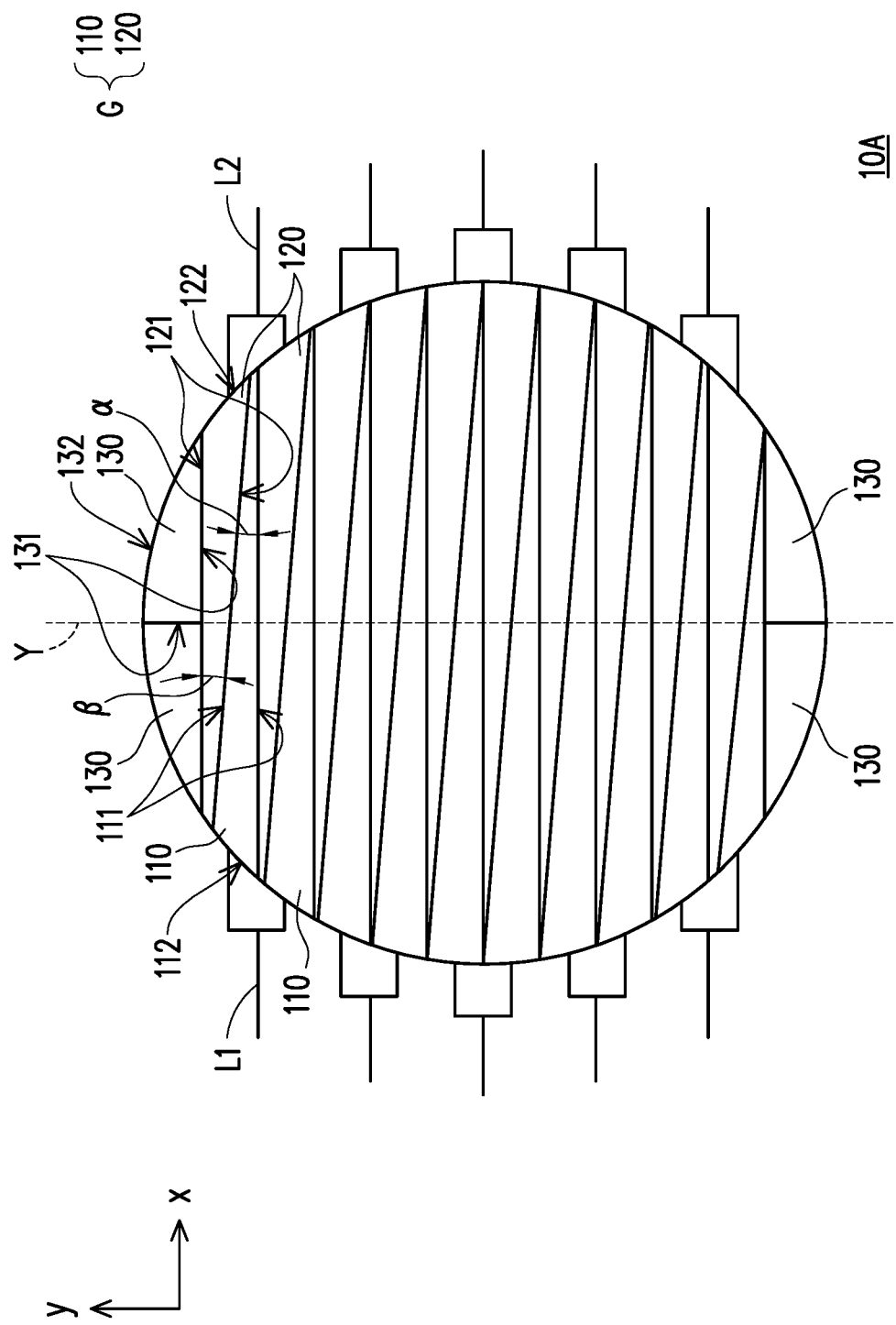
FIG. 2 is a schematic top view of a touch apparatus 10A according to another embodiment of the invention.
Figure 3:
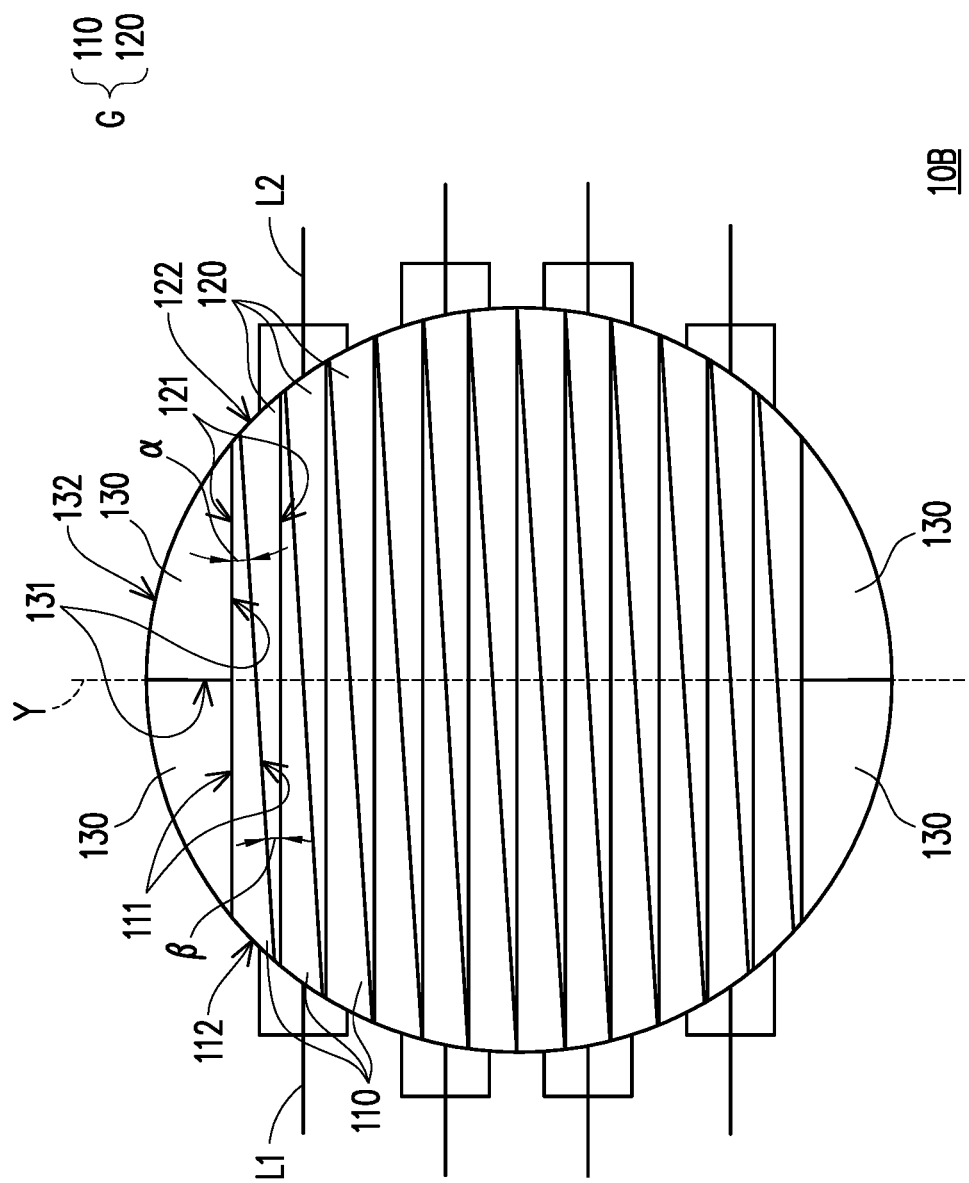
FIG. 3 is a schematic top view of a touch apparatus 10B according to still another embodiment of the invention.

FIG. 2 is a schematic top view of a touch apparatus 10A according to another embodiment of the invention. FIG. 3 is a schematic top view of a touch apparatus 10B according to still another embodiment of the invention. The touch apparatuses 10A and 10B of FIG. 2 and FIG. 3 are similar to the touch apparatus 10 of FIG. 1. The difference between the touch apparatuses 10A and 10B of FIG. 2 and FIG. 3 and the touch apparatus 10 of FIG. 1 lies in that the touch apparatuses 10A and 10B of FIG. 2 and FIG. 3 may be provided with a larger number of the first and second touch electrodes 110 and 120 which are in triangular shapes or approximate triangular shapes to realize a non-rectangular touch area (e.g., a circular touch area, but the invention is not limited thereto) of a larger area.

Figure 4:
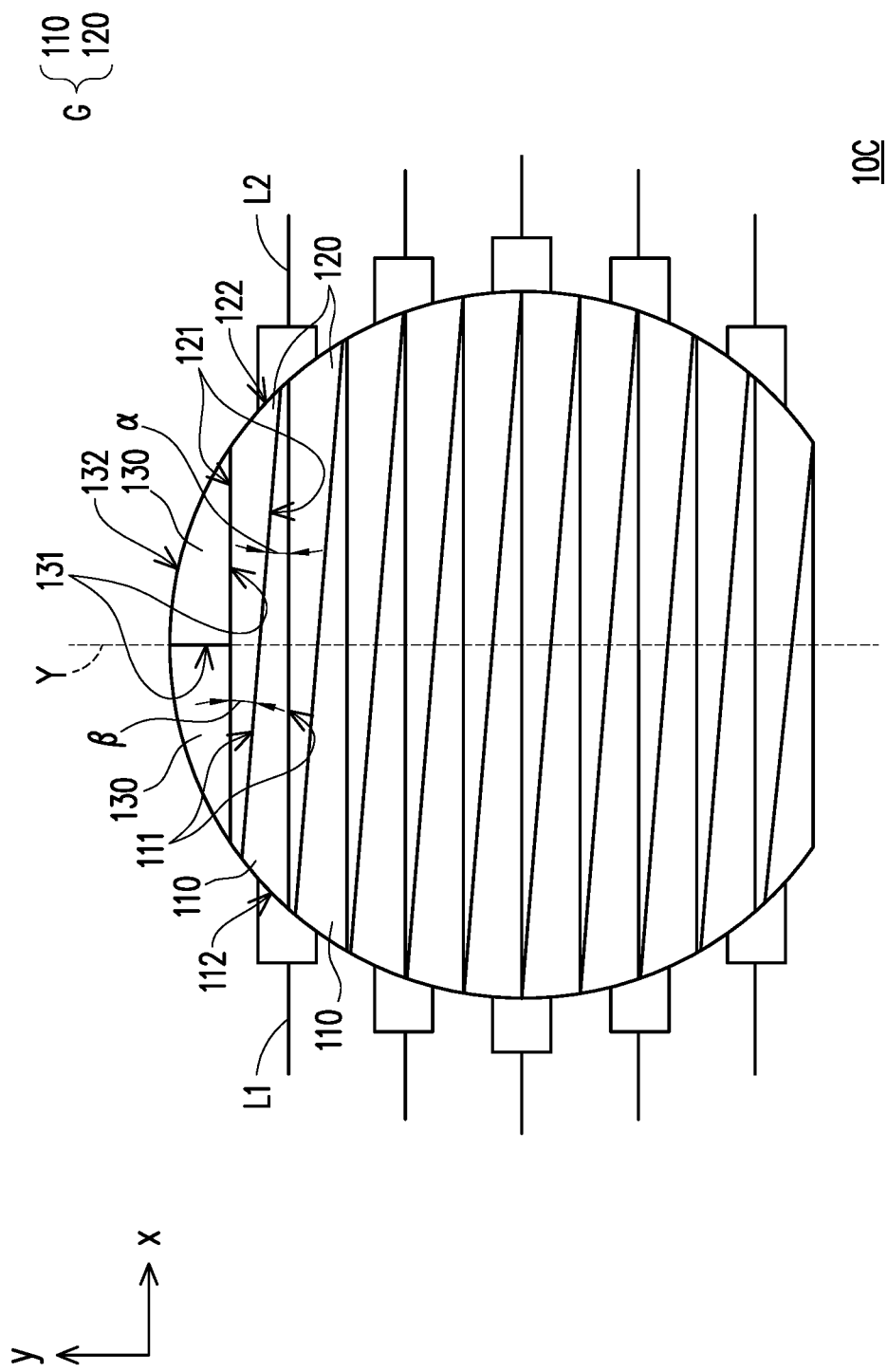
FIG. 4 is a schematic top view of a touch apparatus 10C according to still another embodiment of the invention.

FIG. 4 is a schematic top view of a touch apparatus 10C according to still another embodiment of the invention. The touch apparatus 10C of FIG. 4 is similar to the touch apparatus 10 of FIG. 1, and the difference between the touch apparatus 10C of FIG. 4 and the touch apparatus 10 of FIG. 1 is as follows. In the embodiment of FIG. 4, the non-rectangular touch area defined by the first touch electrodes 110, the second touch electrodes 120, and the peripheral electrodes 130 of the touch apparatus 10C may be a quasi-circular touch area, e.g., a major segment touch area, but the invention is not limited thereto.

In addition, in the embodiment of FIG. 1, the peripheral electrodes 130 (e.g., the arcuate triangular electrodes) of the touch apparatus 10 are disposed on two opposite sides of the first and second touch electrodes 110 and 120. However, in the embodiment of FIG. 4, the peripheral electrodes 130 (e.g., the arcuate triangular electrodes) of the touch apparatus 10C are disposed on one side of the first and second touch electrodes 110 and 120. In brief, the configuration of the peripheral electrode 130 of the touch apparatus 10C may be appropriately modified according to the shape of the non-rectangular touch area of the touch apparatus 10C, and the invention is not limited thereto.

Figure 5:
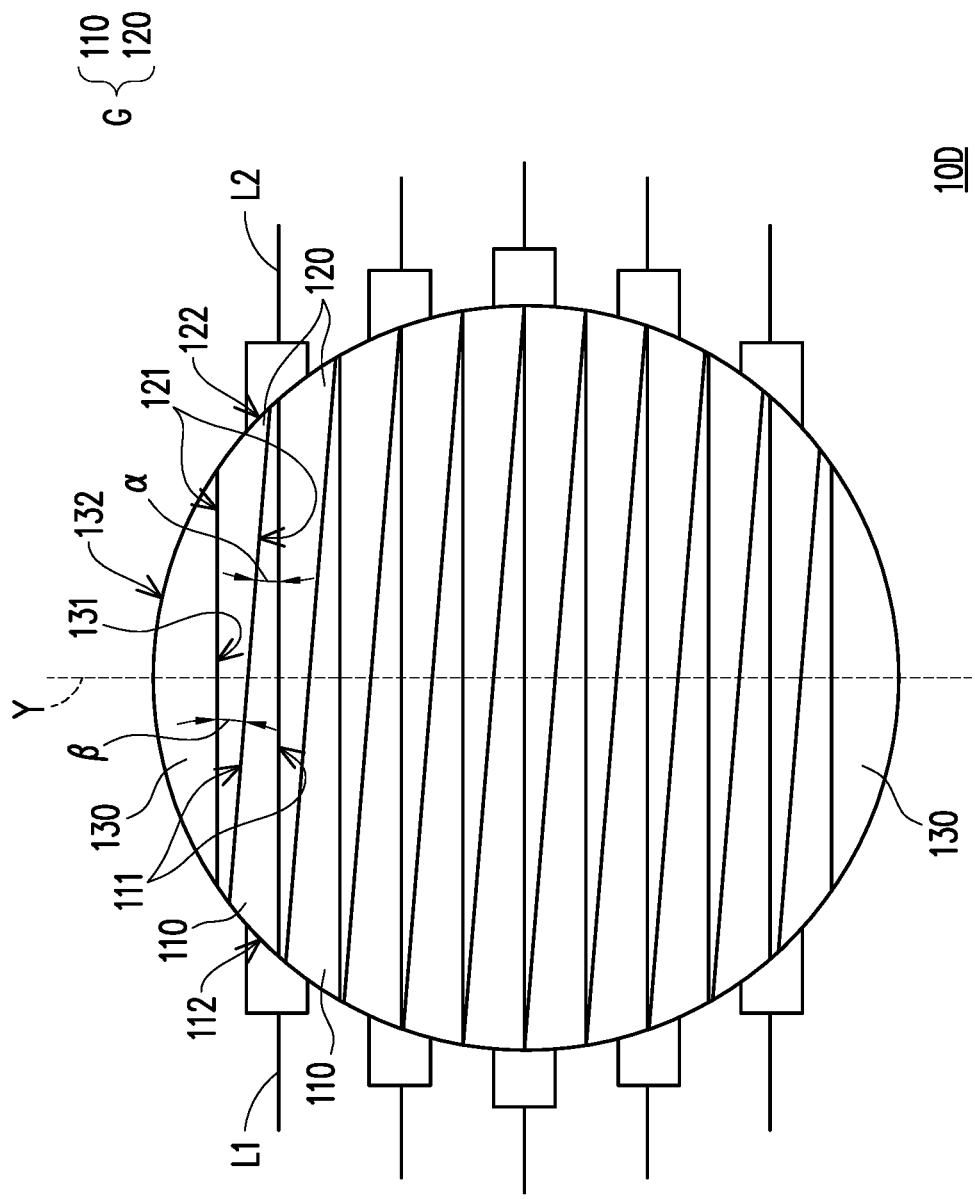
FIG. 5 is a schematic top view of a touch apparatus 10D according to an embodiment of the invention.

FIG. 5 is a schematic top view of a touch apparatus 10D according to an embodiment of the invention. The touch apparatus 10D of FIG. 5 is similar to the touch apparatus 10 of FIG. 1. The difference between the touch apparatus 10D of FIG. 5 and the touch apparatus 10 of FIG. 1 lies in that, in the embodiment of FIG. 5, the peripheral electrodes 130 of the touch apparatus 10D may be circular segment electrodes respectively disposed on the two opposite sides of the first and second touch electrodes 110 and 120.

Figure 6:
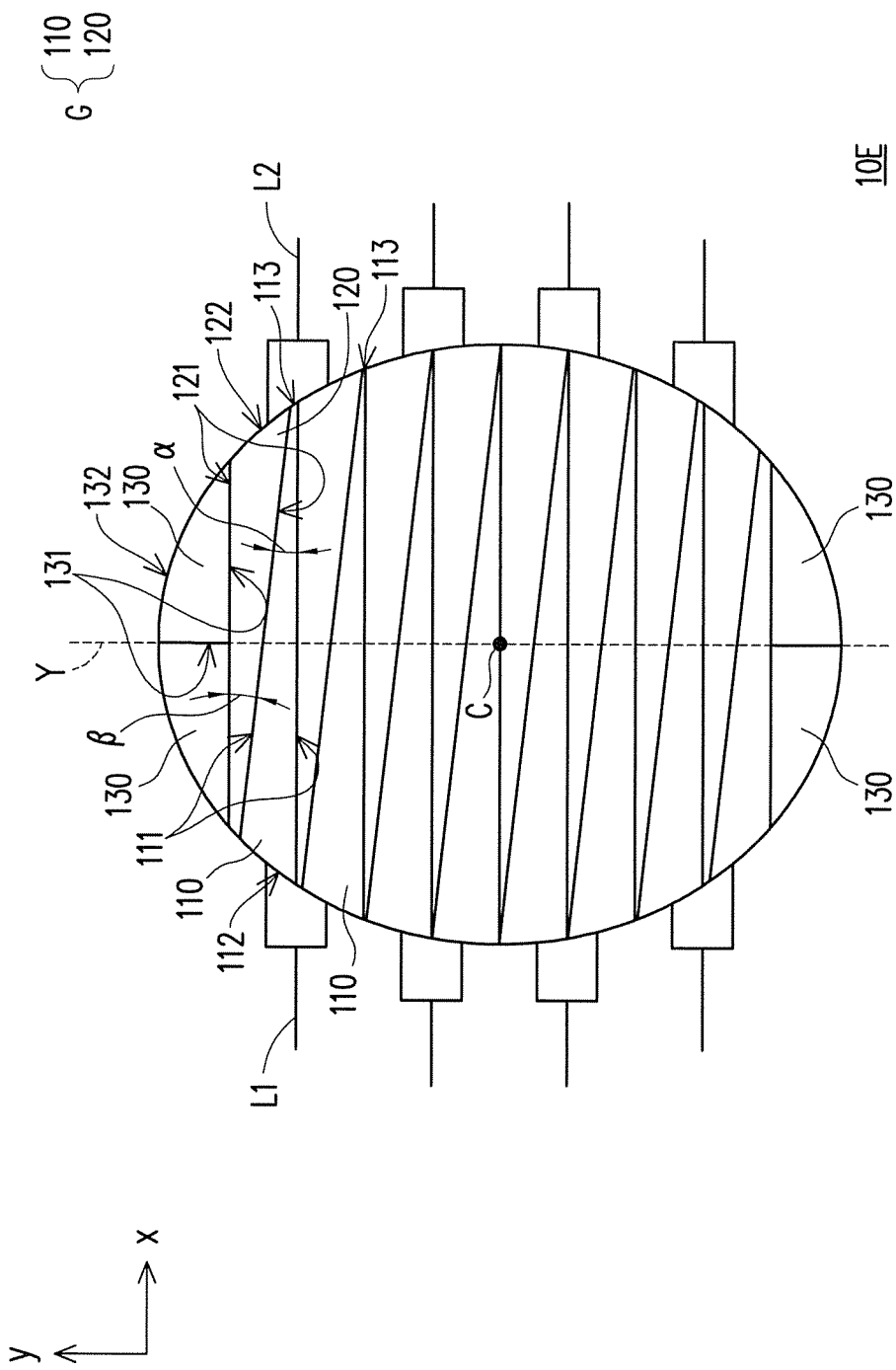
FIG. 6 is a schematic top view of a touch apparatus 10E according to another embodiment of the invention.

FIG. 6 is a schematic top view of a touch apparatus 10E according to another embodiment of the invention. The touch apparatus 10E of FIG. 6 is similar to the touch apparatus 10 of FIG. 1. The difference between the touch apparatus 10E of FIG. 6 and the touch apparatus 10 of FIG. 1 lies in that, in the embodiment of FIG. 6, the non-rectangular touch area defined by the first touch electrodes 110, the second touch electrodes 120, and the peripheral electrodes 130 of the touch apparatus 10E may be an elliptical touch area.

The touch apparatuses 10A to 10E described above have similar functions and advantages as the touch apparatus 10, which shall not be repeatedly described herein.

Furthermore, in any one of the embodiments of FIG. 1 to FIG. 6, the first edge 111 (also referred to as a first upper edge) located at the upper half of each of the first touch electrodes 110 is substantially parallel to the first edge 111 located at the upper half of any other first touch electrode 110. The first edge 111 (also referred to as a first lower edge) located at the lower half of each of the first touch electrodes 110 is substantially parallel to the first edge 111 located at the lower half of any other first touch electrode 110. The second edge 121 (also referred to as a second upper edge) located at the upper half of each of the second touch electrodes 120 is substantially parallel to the second edge 121 located at the upper half of any other second touch electrode 120. The second edge 121 (also referred to as a second lower edge) located at the lower half of each of the second touch electrodes 120 is substantially parallel to the second edge 121 located at the lower half of any other second touch electrode 120. With the first touch electrode 110 and the second touch electrode 120 described above, the touch position can be accurately calculated by using a simple algorithm.

Figure 7:
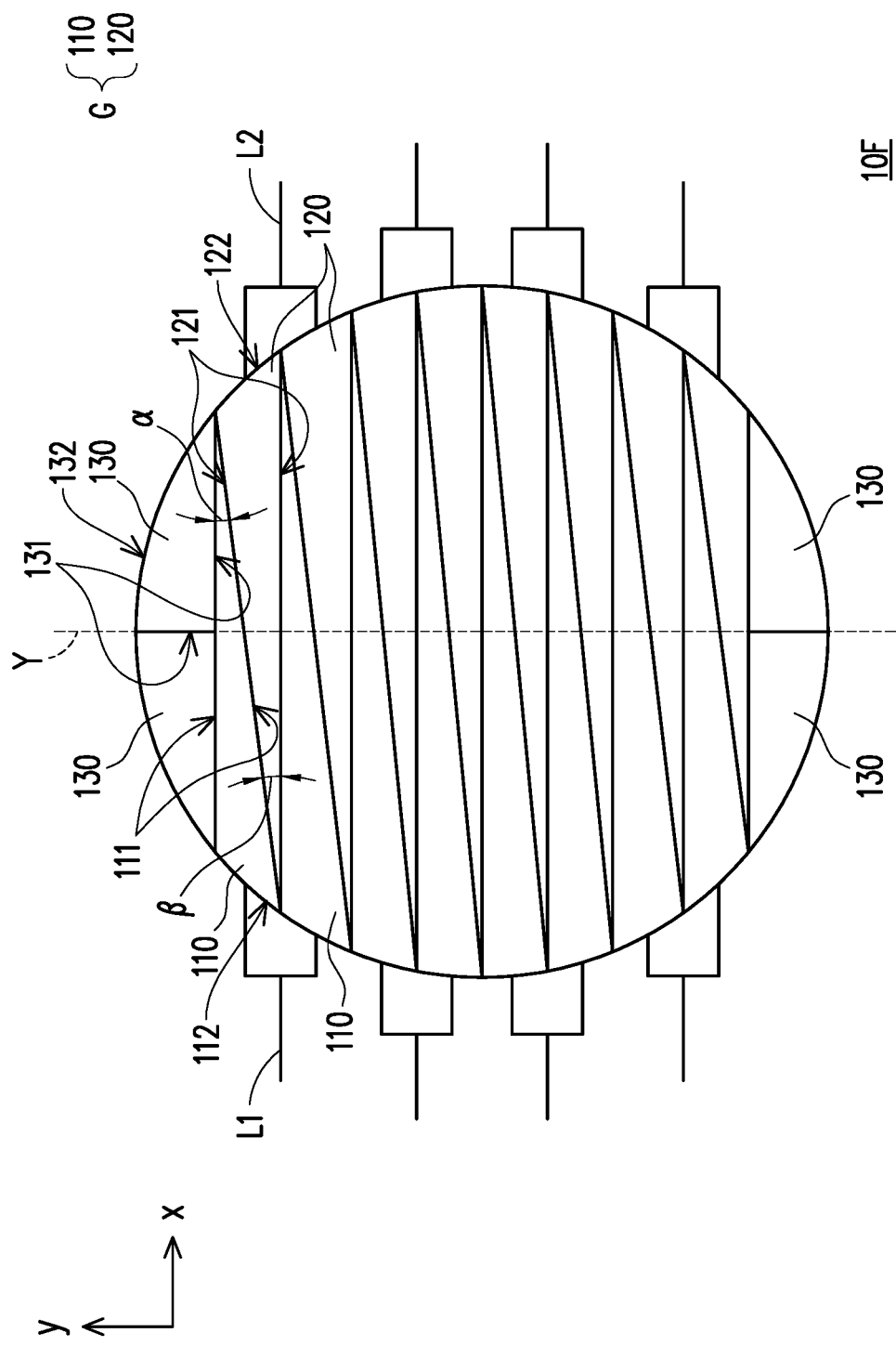
FIG. 7 is a schematic top view of a touch apparatus 10F according to still another embodiment of the invention.

FIG. 7 is a schematic top view of a touch apparatus 10F according to still another embodiment of the invention. The touch apparatus 10F of FIG. 7 is similar to the touch apparatus 10 of FIG. 1, and the difference between the touch apparatus 10F of FIG. 7 and the touch apparatus 10 of FIG. 1 is as follows.

In the embodiment of FIG. 7, the first edge 111 located at the upper half of each of the first touch electrodes 110 is not parallel to the first edge 111 located at the upper half of at least another first touch electrode 110. The first edge 111 located at the lower half of each of the first touch electrodes 110 is not parallel to the first edge 111 located at the lower half of at least another first touch electrode 110. The second edge 121 located at the upper half of each of the second touch electrodes 120 is not parallel to the second edge 121 located at the upper half of at least another second touch electrode 120. The second edge 121 located at the lower half of each of the second touch electrodes 120 is not parallel to the second edge 121 located at the lower half of at least another second touch electrode 120.

In the embodiment of FIG. 7, the first edges 111 of each of the first touch electrodes 110 has a first intersection, the second edges 121 of each of the second touch electrodes 120 has a second intersection, and the first intersections of the first touch electrodes 110 and the second intersections of the second touch electrodes 120 are all located on a reference circle. In the embodiment of FIG. 1, the first intersections of the first touch electrodes 110 and the second intersections of the second touch electrodes 120 are not all located on a reference circle. In the embodiment of FIG. 1, the circular touch area has a geometric center C, each of the first touch electrodes 110 further has a third side edge 113, the third side edge 113 is connected to the first edges 111 and is disposed opposite to the first side edge 112; a length of the third side edge 113 of one of first touch electrodes 110 is larger than a length of the third side edge 113 of another of first touch electrodes 110, and the one of first touch electrodes 110 is farther from the geometric center C of the circular touch area than the another of first touch electrodes 110. In the embodiment of FIG. 6, the quasi-circular touch area has a geometric center C, each of the first touch electrodes 110 further has a third side edge 113, the third side edge 113 is connected to the first edges 111 and is disposed opposite to the first side edge 112; a length of the third side edge 113 of one of first touch electrodes 110 is larger than a length of the third side edge 113 of another of first touch electrodes 110, and the one of first touch electrodes 110 is farther from the geometric center C of the quasi-circular touch area than the another of first touch electrodes 110.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch apparatus comprising:
    first touch electrodes, wherein each of the first touch electrodes has first edges and a first side edge, a first acute angle is included by the first edges, and the first side edge is connected to the first edges and is disposed opposite to the first acute angle, and the first side edge is an arc-shaped edge;
    second touch electrodes, wherein each of the second touch electrodes has second edges and a second side edge, a second acute angle is included by the second edges, the second side edge is connected to the second edges and is disposed opposite to the second acute angle, and the second side edge is an arc-shaped edge; and
    a peripheral electrode disposed outside the first touch electrodes and the second touch electrodes wherein a shape of the peripheral electrode is different from a shape of each of the first touch electrodes and a shape of each of the second touch electrodes, and the peripheral electrode has an arc-shaped edge;
    wherein the first side edge of the first touch electrodes, the second side edge of the second touch electrodes and the arc-shaped edge of the peripheral electrode are arranged in a circle or a quasi-circle to define a circular touch area or a quasi-circular touch area, and
    the first touch electrodes and the second touch electrodes are alternately arranged along a vertical axis of the circular touch area or on a vertical axis of the quasi-circular touch area, and the first acute angles of the first touch electrodes and the second acute angles of the second touch electrodes are respectively located on two sides of the vertical axis of the circular touch area or on two sides of the vertical axis of the quasi-circular touch area.

2. The touch apparatus according to claim 1, wherein the first touch electrodes and the second touch electrodes are divided into touch electrode groups, each of the touch electrode groups comprises one of the first touch electrodes and one of the second touch electrodes which are adjacent to each other, and the touch apparatus further comprises:
    a first conductive line, wherein the first touch electrodes of adjacent touch electrode groups are electrically connected to a single first conductive line; and
    a second conductive line, wherein the second touch electrodes of adjacent touch electrode groups are electrically connected to a single second conductive line.

3. The touch apparatus according to claim 1, wherein the quasi-circular touch area comprises an elliptical touch area or a major segment touch area.

4. The touch apparatus according to claim 1, wherein the peripheral electrode comprises arcuate triangular electrodes.

5. The touch apparatus according to claim 4, wherein the arcuate triangular electrodes are disposed on one side of the first touch electrodes.

6. The touch apparatus according to claim 4, wherein the arcuate triangular electrodes are disposed on two opposite sides of the first touch electrodes.

7. The touch apparatus according to claim 1, wherein the peripheral electrode comprises at least one circular segment electrode.

8. The touch apparatus according to claim 7, wherein the at least one circular segment electrode is multiple circular segment electrodes respectively disposed on two opposite sides of the first touch electrodes.

9. The touch apparatus according to claim 1, wherein the first edges of each of the first touch electrodes comprise a first upper edge and a first lower edge, the first upper edges of the first touch electrodes are substantially parallel to each other, and the first lower edges of the first touch electrodes are substantially parallel to each other.

10. The touch apparatus according to claim 1, wherein the second edges of each of the second touch electrodes comprise a second upper edge and a second lower edge, second upper edges of the second touch electrodes are substantially parallel to each other, and second lower edges of the second touch electrodes are substantially parallel to each other.

11. A touch apparatus comprising:
    first touch electrodes, wherein each of the first touch electrodes has first edges and a first side edge, a first acute angle is included by the first edges, the first side edge is connected to the first edges and is disposed opposite to the first acute angle, the first side edge is an arc-shaped edge, extension lines of the first edges have a first intersection, and first intersections of the extension lines of the first edges of the first touch electrodes are not located on a reference circle or a reference quasi-circle;
    second touch electrodes, wherein each of the second touch electrodes has second edges and a second side edge, a second acute angle is included by the second edges, the second side edge is connected to the second edges and is disposed opposite to the second acute angle, and the second side edge is an arc-shaped edge; and
    a peripheral electrode disposed outside the first touch electrodes and the second touch electrodes, wherein a shape of the peripheral electrode is different from a shape of each of the first touch electrodes and a shape of each of the second touch electrodes, and the peripheral electrode has an arc-shaped edge,
    wherein the first side edge of the first touch electrodes, the second side edge of the second touch electrodes and the arc-shaped edge of the peripheral electrode are arranged in a circle or a quasi-circle to define a circular touch area or a quasi-circular touch area, the circular touch area coincides with the reference circle, and the quasi-circular touch area coincides with the reference quasi-circle, and
    the first touch electrodes and the second touch electrodes are alternately arranged along a vertical axis of the circular touch area or on a vertical axis of the quasi-circular touch area, and the first acute angles of the first touch electrodes and the second acute angles of the second touch electrodes are respectively located on two sides of the vertical axis of the circular touch area or on two sides of the vertical axis of the quasi-circular touch area.

12. The touch apparatus according to claim 11, wherein the circular touch area has a geometric center, the quasi-circular touch area has a geometric center; each of the first touch electrodes further has a third side edge, the third side edge is connected to the first edges and is disposed opposite to the first side edge; a length of the third side edge of one of first touch electrodes is larger than a length of the third side edge of another of first touch electrodes, and the one of first touch electrodes is farther from the geometric center of the circular touch area or the geometric center of the quasi-circular touch area than the another of first touch electrodes.

* * * * *